United States Patent [19]

Roginski et al.

[11] Patent Number: 5,122,403
[45] Date of Patent: Jun. 16, 1992

[54] WINDSHIELD EDGE SEAL

[75] Inventors: Amy M. Roginski, New Kensington; Bruce A. Connelly, Gibsonia; George H. Bowser, New Kensington, all of Pa.

[73] Assignee: PPG Industries, Inc., Pittsburgh, Pa.

[21] Appl. No.: 332,840

[22] Filed: Apr. 3, 1989

[51] Int. Cl.⁵ .................. B32B 17/10; B32B 31/12
[52] U.S. Cl. ............................... 428/38; 52/789; 156/107; 219/203; 219/522; 427/163; 427/165
[58] Field of Search ................... 52/788–790; 156/99, 100, 107, 109; 219/203, 522; 427/163–165; 428/34, 38

[56] References Cited

U.S. PATENT DOCUMENTS

| | | |
|---|---|---|
| 3,752,348 | 8/1973 | Dickason et al. |
| 3,790,752 | 2/1974 | Boaz et al. |
| 3,794,809 | 2/1974 | Beck et al. |
| 3,833,451 | 9/1974 | Wagner ............... 156/107 X |
| 4,046,951 | 9/1971 | Stefanik .............. 428/412 |
| 4,278,875 | 7/1981 | Bain |
| 4,284,677 | 8/1981 | Herliczek |
| 4,339,553 | 7/1982 | Yoshimura et al. |
| 4,368,945 | 1/1983 | Fujimori et al. |
| 4,456,335 | 6/1984 | Mumford .............. 52/788 X |
| 4,503,179 | 3/1985 | Yoshimura et al. |
| 4,543,466 | 9/1985 | Ramus |
| 4,593,175 | 6/1986 | Bowser et al. |
| 4,610,771 | 9/1986 | Gillery |
| 4,622,249 | 11/1986 | Bowser |
| 4,654,067 | 3/1987 | Ramus et al. |
| 4,668,270 | 5/1987 | Ramus |
| 4,701,508 | 10/1987 | Homma et al. |
| 4,718,932 | 1/1988 | Pharms |
| 4,725,710 | 2/1988 | Ramus et al. |
| 4,743,741 | 5/1988 | Ramus |
| 4,744,844 | 5/1988 | Hurst |
| 4,782,216 | 11/1988 | Woodward |
| 4,786,784 | 11/1988 | Nikodem et al. |

OTHER PUBLICATIONS

Jack Yamaguchi "Insulating rear glass lowers interior temperature", Automotive Engineering, Apr. 1985.

Primary Examiner—Robert A. Dawson
Attorney, Agent, or Firm—Andrew C. Siminerio; Donald C. Lepiane

[57] ABSTRACT

A laminated transparency with an electroconductive coating positioned within the laminate. An edge coating composition is applied about the periphery of the laminate to seal the edge of the coating and prevent coating degradation.

23 Claims, 1 Drawing Sheet

WINDSHIELD EDGE SEAL

BACKGROUND OF THE INVENTION

1. Field of the Invention

This invention relates to a laminated transparency having an edge seal and in particular to an edge seal for a laminated windshield having an electroconductive coating between the outer plies of the windshield.

2a. Technical Considerations

It is well known to coat a major surface of a transparency, e.g. a glass sheet, with a transparent film to enhance the spectral properties of the transparency. For example, the film may be used to reduce the amount of infrared (IR) radiation transmitted through the transparency by reflecting a predetermined bandwidth of radiation. This reduction is especially useful where the transparency is installed in a vehicle, such as an automotive windshield, since the IR radiation is a major cause of heat build-up in a vehicle. The resulting reduction in heat build-up reduces the burden on the vehicle's air conditioning system to maintain a comfortable temperature within the vehicle for its occupants. In addition, if the film is electroconductive, a current may be passed through the film to raise the temperature of the transparency. The elevated temperature of the windshield will melt any ice or snow that accumulates on an exposed surface of the windshield.

In fabricating a laminated transparency such as a windshield with a film positioned between the glass plies, the film can be applied to a flat glass sheet which is subsequently shaped and laminated to a matching glass ply or the film may be applied to a bent glass ply which is then laminated to a matching ply. It has been found that when the film extends to the edge of the laminate, it may degrade due to exposure to the environment. In particular, where the film contains a silver layer, it has observed that sodium chloride from salts will react with the silver forming silver chloride. In addition, high humidity conditions have been found to cause the silver in the silver layer to form aggregates. The results of either or both of these conditions is discoloration of the film, reduced effectiveness of the film as a IR radiation reflecting or heating film, and/or possible delamination of the windshield. The marginal edge of the coated glass ply may be masked, for example with tape prior to coating the glass so that after the coating operation, the tape is removed, leaving an uncoated marginal edge. However, this type of processing requires precise positioning of the tape prior to coating and removal of the tape after coating as well as introducing the possibility of contaminating the film during a coating operation.

It would be advantageous to provide a material to seal the periphery of a coated laminate to prevent degradation of its film coating.

2b. Patents of Interest

U.S. Pat. Nos. 3,752,348 to Dickason et al.; 4,543,466, 4,668,270, and 4,743,741 to Ramus; 4,654,067 and 4,725,710 to Ramus et al.; 4,718,932 to Pharms; 4,744,844 to Hurst; 4,778,732 to Hasegawa et al. and 4,786,784 to Nikodem et al. teach a heatable windshield with opposing bus bars interconnected by an electroconductive coating on an interior glass surface of the windshield.

U.S. Pat. No. 3,790,752 to Boaz et al. teaches a heatable laminated windshield wherein the electrical connection to the electrically conductive coating of the windshield is made within a notch in the windshield interlayer material.

U.S. Pat. Nos. 3,794,809 to Beck et al.; 4,368,945 Fujimori et al. and 4,782,216 to Woodward teach a vehicle windshield with an electroconductive coating disposed between first and second laminating interlayers. In Beck et al., the coating is spaced inwardly from the edge of the glass plies of the windshield a sufficient amount to seal the coating within the interlayer.

U.S. Pat. No. 4,278,875 to Bain teaches an electrically heated window with a tin oxide coating extending to the edge of the window. The edge of the window is seal by an elastomeric sealant and a peripheral channel.

U.S. Pat. No. 4,284,677 to Herliczek teaches an electrically heated laminated aircraft glazing with an electroconductive coating. A layer of polyisobutylene resin is provided between the interlayer material and selected glass areas to prevent delamination and cold chipping of the glazing with subsequent moisture ingress and bus bar failure.

SUMMARY OF THE INVENTION

The present invention covers a laminated transparency having a coating between the outer plies of the transparency. The coating is of the type that will degrade when exposed to prolonged adverse weather conditions, such as high salt and/or humidity. A sealant is applied about the periphery of the coating to protect any exposed edge portion of the coating from degradation. The sealant is a weather resistant material that will adhere to glass and interlayer material and will not react with the glass, interlayer material, or coating of the transparency or any adhesives used to secure the transparency in place.

In one particular embodiment of the invention, the coating includes at least one silver containing film layer and the sealant may be a polybutene copolymer based coating composition, a fluoropolymer based coating composition, or a butyl based composition. The coating may be used to reduce the level of infrared radiation that can pass through the laminate and/or an electric current carried by the coating can heat the transparency.

DETAILED DESCRIPTION OF THE INVENTION

The description of the invention is taught in connection with a laminated transparency comprised of two glass plies bonded together by an interlayer of plastic, which represents a typical windshield construction, but it is understood that the invention can apply to transparencies having two plastic plies or any combination involving numerous glass and/or plastic plies. The invention is not limited to an automotive windshield but may be used in any transparency where there is a problem of coating degradation along an exposed edge.

Figure 1:
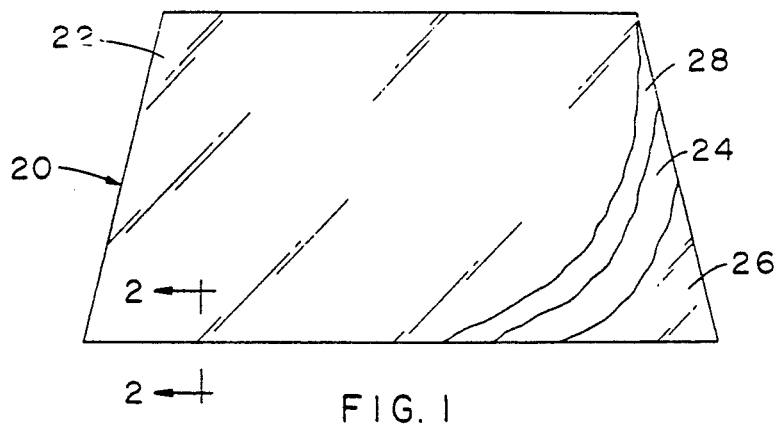
FIG. 1 is a plan view of a laminated transparency incorporating features of the present invention, with portions removed for clarity.
Figure 2:
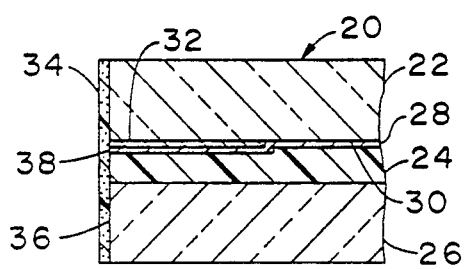
FIG. 2 is a view taken along line 2—2 of FIG. 1 with the view inverted to show a sealant along the edge of the transparency.

FIGS. 1 and 2 show a transparency 20 which includes an outboard glass sheet 22, a plastic interlayer 24 (shown only in FIG. 2) which may be polyvinyl butyral as is commonly used for laminated windshields or other suitable interlayer material, and an inboard glass sheet 26 (shown only in FIG. 2). A coating 28 is preferably placed on a surface of the transparency 20 that is not exposed, most preferably on the inboard surface 30 of the outboard glass sheet 22. Various coating configurations may be applied to the surface 30, depending on the desired properties to be added to the transparency 20. For example, although not limiting in the present invention, coatings similar to those disclosed in U.S. Pat. No. 4,610,771 to Gillery, which teachings are hereby incorporated by reference, have been used to reflect IR radiation and/or provide an electroconductive film for a heatable windshield. These coatings generally include one or more silver films between pairs of zinc stannate films, each of which may be applied sequentially by magnetron sputtering. An optional opaque border 32 (shown only in FIG. 2), such as a ceramic enamel, may be applied about the marginal edge of the transparency 20 in any well known manner, e.g. screen printing, and heated to bond the border 32 to surface 30. After coating, the interlayer 24 is positioned between the bent glass sheets 22 and 26 and the entire assembly is laminated in any convenient manner well known in the art to form a unitary structure. As an alternative, the coating 28 may be applied to a flat glass ply 22 which is subsequently bent to a desired configuration.

With continued reference to FIGS. 1 and 2, edge sealant 34 is applied about the peripheral edge 36 of the laminated transparency 20 to hermetically seal exposed edge 38 of the coating 28 and isolate it from the environment. In particular, the sealant 34 should be a weather resistant material that provides good adhesion to the glass plies 22 and 26 and interlayer 24 and prevents moisture penetration through or under the sealant 34. The sealant 34 must also be non-reactive with the interlayer 24 and coating 28 and prevent penetration of any material that will react with the interlayer 24 or coating 28. In particular, if the coating 28 is of the type that includes a layer of silver, the sealant 34 must not include and must seal against chlorine and/or sulfur containing compounds, both of which will react with the silver and adversely affect the coating's IR radiation and/or surface resistivity. Furthermore, the sealant 34 is preferably a material that can be easily applied to form a tack free, hermetic seal. The sealant must also not affect or react with the adhesive system used to secure the laminated transparency in position.

The following are working examples of preferred edge sealant formulations.

EXAMPLE 1

Polybutene copolymer based coating compositions exhibit good durability and weathering resistance. In particular, the butane octane based coating composition described hereinbelow in Table 1 have been used as sealant to edge seal the periphery of transparency 20.

TABLE 1

| Materials | Amount (Parts by Weight) | | |
|---|---|---|---|
| | A | B | Est. Min./Max |
| 1. DURAFLEX polybutene 8910 | 33.00 | 32.20 | 100 |
| 2. STATEX N-550 | 30.40 | 1.60 | 0–110 |
| 3. MOLECULAR SIEVE 13X | — | 29.90 | 0–110 |
| 4. DOW CORNING Z-6030 | 0.13 | — | 0.1–2.0 |
| 5. DOW CORNING Z-6040 | 0.13 | 0.13 | 0.1–2.0 |
| 6. NUCREL 925 | 3.30 | 3.30 | 2–30 |
| 7. VISTANEX LM. MS | 16.50 | 16.30 | 20–70 |
| 8. ESCOREZ 1315 | 16.50 | 16.30 | 20–70 |

(1) DURAFLEX polybutene 8910 is the registered trademark of Shell Chemical Co. for a isotatic thermoplastic polyolefin which contains 6% ethylene.
(2) STATEX N-550 is the registered trademark of Columbian Chemical Co. for a general purpose amorphous furnace black.
(3) MOLECULAR SIEVE 13X is the registered trademark of Union Carbide Corp. for an aluminum silicate, zeolite-type desiccant.
(4), (5) DOW CORNING Z-6030 and Z-6040 are the registered trademarks of Dow Corning Corp. for a silane coupling agent; gamma methacryloxypropyltrimethoxysilane and gama glycidoxypropyltrimethoxysilan, respectively.
(6) NUCREL 925 is the registered trademark of E. I. DuPont deNemours & Co., Inc. for an ethylene carboxylic copolymer.
(7) VISTANEX LM. MS is a registered trademark of Exxon Chemical Co. for the high molecular weight polyisobutylene resin.
(8) ESCOREZ 1315 is the registered trademark of Exxon Chemical Co. for a saturated hydrocarbon resin.

These polybutene copolymer based coating compositions are thermoplastic compositions that when heated to about 350° F. to 400° F. (177° C. to 204° C.) have a putty-like consistency which can then be applied to the peripheral edge 36 of the transparency 20 in any convenient manner known in the art, e.g. using a hot gun extruder. These compositions are 100% solids so that no venting is required during mixing, application, or curing and there are no noxious fumes from solvents. The compositions cool to room temperature and will be tack-free within 5 minutes of application. However, since these materials are a thermoplastic, it is expected that they will become soft if exposed to temperatures exceeding about 200° F. (93° C.). The thickness and shape of the sealant can be controlled to give the required seal and, if required, protect the periphery of the transparency 20 against impact.

EXAMPLE 2

Fluoropolymer based coating compositions such as those disclosed in U.S. patent application Ser. No. 224,837 to Connelly et al., filed on Jul. 27, 1988, provide excellent durability, resistance to weather and good adhesion to glass surfaces. In particular, a polyvinylidene fluoride (PVDF) based coating composition as described hereinbelow in Table 2 has been used to edge seal the periphery of the transparency 20.

TABLE 2

| Material | Amount (Parts by Weight) |
|---|---|
| Pigment | 1.05 |
| 1. SHEPARD BLACK pigment | |
| Binder | |
| 2. thermoplastic acrylic resin | 12.84 |
| 3. bentonite flow additive | 0.09 |
| 4. UNION CARBIDE A-187 silane | 1.94 |
| 5. TINUVIN 292 | 1.21 |
| 6. TINUVIN-P | 0.39 |
| 7. 2-mercapto + hiazoline | 0.76 |
| 8. polyvinylidene fluoride | 12.84 |
| Solvent | |
| 9. toluene | 29.15 |
| 10. ethanol | 0.09 |
| 11. ethyl acetate | 3.02 |
| 12. methal isobutyl keytone | 0.54 |

TABLE 2-continued

| Material | Amount (Parts by Weight) |
| --- | --- |
| 13. glycol ether PM acetate | 36.08 |

(1) SHEPARD BLACK pigment is a registered trademark fo Shepard Pigments for an iron oxide pigment
(2) The thermoplastic acrylic resin is a copolymer of ethyl acrylate and methyl methacrylate commercially available from Rohm and Haas as ACRYLOID B-44.
(4) UNION CARBIDE A-187 is a registered trademark of Union Carbide Co. for an epoxy silane: gamma- glycidoxypropyltrimethoxy silane.
(5) TINUVIN 292 is a registered trademark of Ciba Geigy Corp. for a hinder amine light stabilizer.
(6) TINUVIN-P is a registered trademark of Ciba Geigy Corp. for a UV light absorber.

Due to the volatile nature of the solvent system for this PVDF based coating composition, venting is required to remove any noxious fumes that are released during its application and curing. The PVDF based coating may be applied at room temperature, will dry tack-free in approximately 15 minutes, and will fully cure in about 120 hours. Drying and curing times can be reduced by increasing the drying or curing temperature and/or decreasing the relative amount of solids. The PVDF based coating composition will not flow when exposed to temperatures of up to about 225° F. (107° C.) which is the expected upper limit to which the transparency will be exposed. The coating may be applied in any convenient manner known in the art, e.g. a roller, dauber, or brush. Although not limiting in the invention, the thickness of the coating on the transparency should be about 1 mil (0.025 mm).

EXAMPLE 3

Butyl based coating compositions similar to that disclosed in U.S. Pat. No. 4,593,175 to Bowser et al., which teachings are incorporated by reference, have been used as vapor barriers. In particular, the butyl based composition as described hereinbelow in Table 3 may be used to seal the exposed coating edge in transparency 20.

TABLE 3

| Materials | Amount (Parts by Weight) | | | |
| --- | --- | --- | --- | --- |
| | A | B | C | D |
| 1. BUTYL 165 | 100 | 100 | 100 | 100 |
| 2. VISTANEX LM. MS | 30 | 30 | 30 | 30 |
| 3. STATEX N-550 | 50 | 50 | 50 | 60 |
| 4. ZnO xx4 | 5 | 5 | 5 | 5 |
| 5. MOLECULAR SIEVE 13X | — | — | — | 20 |
| 6. HI SIL EP | — | — | — | 5 |
| 7. DOW CORNING Z-6040 | — | — | — | 0.4 |
| 8. ESCOREZ 1315 | 60 | 70 | 70 | 70 |
| 9. SP-1055 | 10 | — | — | 70 |
| 10. VM&P NAPHTHA | 595 | 595 | 474 | 669 |

(1) BUTYL 165 is the registered trademark of Exxon Chemical Co. for an isobutylene-isoprene elastomer (11R).
(2) VISTANEX LM. MS is the registered trademark of Exxon Chemical Company for a high molecular weight polyisobutylene resin.
(3) STATEX N-550 is the registered trademark of Columbian Chemical Co. for a general purpose amorphous furnace black.
(4) Zinc oxide xx4 grade is manufactured by New Jersey Zinc Co.
(5) MOLECULAR SIEVE 13X is the registered trademark of Union Carbide Corp. for an aluminum silicate, zeolite-type desiccant.
(6) HI SIL EP is the registered trademark of PPG Industries, Inc. for a hydrated amorphous silica.
(7) DOW CORNING Z-6040 is the registered trademark of Dow Corning Corp. for a silane coupling agent: gamma- glycidoxypropyltrimethoxysilan.
(8) ESCOREZ 1315 is the registered trademark of Exxon Chemical Co. for a saturated hydrocarbon resin.
(9) SP-1055 is a registered trademark of Schenectady Chemicals, Inc. for a bromomethylated alkyl phenol formaldehyde resin.
(10) VM&P NAPHTHA is varnish makers' naphtha; a solvent with a narrow boiling point.

In testing these butyl based compositions, formulations A, B, and C exhibited only marginal adhesion to a glass surface. The addition of the Z-6040 silane to the formulation enhances adhesion. The formulations will dry in approximately 5 minutes but still remain tacky.

Additional carbon black and/or filler material, such as e.g. hydrated silica, can be added to the formulation to reduce tack. The coating may be applied in any convenient manner known in the art, e.g. brush, dauber, or rollers. Although not limiting in the invention, the thickness of the coating on the transparency should be about 1 mil (0.025 mm).

In operation, it is expected that the sealant 34 would be applied to the laminated windshield 20 after the edge 36 has been trimmed to remove any excess interlayer 24 that has been extruded about the periphery of the transparency 20 during the laminating process.

Figure 3:
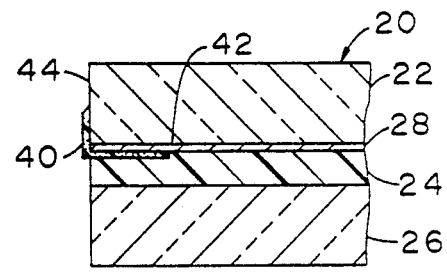
FIG. 3 is a view similar to FIG. 2 showing an alternate embodiment of the invention.

As an alternative to applying the edge sealant 34 after lamination, it may be applied about the peripheral edge of outer glass ply 22 before lamination. In particular, as shown in FIG. 3, after coating 28 has been applied to glass ply 22, edge sealant 40 may be applied to the marginal area 42 and peripheral edge 44 of glass ply 22 to seal the edge of the coating 28 and protect it from the environment and chemical attack after lamination.

Figure 4:
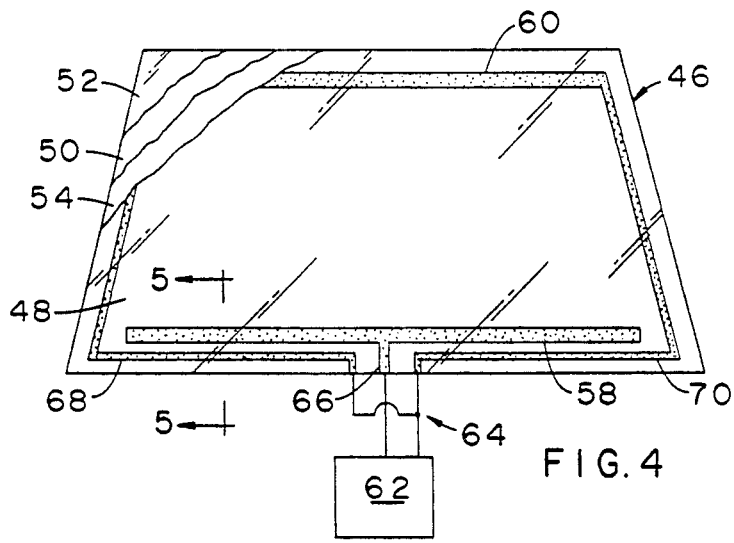
FIG. 4 is a plan view of a heatable laminated transparency incorporating features of the present invention, with portions removed for clarity.
Figure 5:
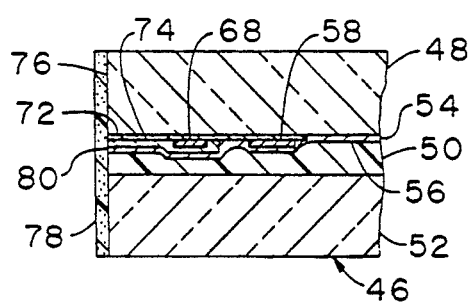
FIG. 5 is a view taken along line 5—5 of FIG. 4 with the view inverted to show a sealant along the edge of the transparency.

The sealant 34 may also be used to edge seal the periphery of a heated laminated transparency. Referring to FIGS. 4 and 5, laminated transparency 46 is a heatable windshield including an outer glass ply 48, interlayer 50, inner glass ply 52, and electroconductive coating 54 on inner surface 56 of outer ply 48. The electroconductive coating 54 is powered by a bus bar and lead arrangement which, although not limiting in the present invention, is similar to the double feed bus bar arrangement disclosed in U.S. patent application Ser. No. 138,008 to Gillery filed on Dec. 28, 1987, which teachings are incorporated by reference. In particular, a bottom bus bar 58 and top bus bar 60 (shown only in FIG. 4) are positioned on surface 56 along opposing edges of outer glass ply 48 and are electrically interconnected by electroconductive coating 54. Electrical power from a power source 62 to bottom bus bar 58 and top bus bar 60 is made at terminal 64 through lead 66 and leads 68 and 70, respectively. Although not limiting in the present invention, the bus bars and leads are preferably a silver containing ceramic material that is applied to glass ply 48 or a ceramic border 72 (shown only in FIG. 5) in any convenient manner, e.g. screen printing, and heated to bond them to the underlying glass or border.

The leads 68 and 70 are electrically insulated from the coating 54 and bottom bus bar 58 by a mask 74 (shown only in FIG. 5), such as e.g. a ceramic paint. Referring to FIG. 5, the coating 54 extends over the mask 74 to the edge 76 of the transparency 46 while remaining electrically insulated from the leads 68 and 70 (lead 70 is not shown in FIG. 5). Sealant 78 is applied about the peripheral edge 76 of transparency 46 to seal exposed edge 80 of coating 54.

Because an electrical current is passed through coating 54 in the heated windshield, it is obvious that the sealant 78 must also be non-electroconductive so as to electrically insulate the exposed edge 80 and prevent shorting of the heated coating 54.

Figure 6:
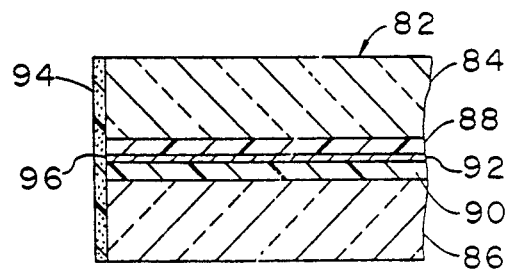
FIG. 6 is a view similar to FIG. 2 showing an alternate embodiment of the invention.

The present invention has been presented with a laminated transparency having a coating on an inner glass surface of the transparency but based on the teachings of this disclosure, it would be obvious to one skilled in the art to use the sealant in combination with any assembly with an exposed coating edge. In particular, referring to FIG. 6, transparency 82 includes glass plies 84 and 86 and interlayers 88 and 90. Coating 92 is disposed between interlayers 88 and 90 of the laminate 82 as disclosed in U.S. Pat. Nos. 4,368,945 to Fujimori et al. and 4,782,216 to Woodard, which teachings are incorporated by reference. Sealant 94 is applied to the exposed edge 96 of a coating 92 to seal it against environmental conditions that could adversely affect the coating.

The present invention provides a laminated transparency having a coating therein that is protected against moisture and chemical attack about its perimeter so as to maintain the integrity of the coating and the transparency. The form of the invention shown and described in this specification represents illustrative preferred embodiments and it is understood that various changes may be made without departing from the spirit of the invention as defined in the following claimed subject matter.

We claim:

1. In a laminated vehicular transparency of the type having a pair of glass plies laminated together, a conductive coating between the plies with portion of the coating extending to a peripheral edge of the transparency, and external conductive means providing external electrical access to the coating, the improvement comprising:
    a weather resistant sealant completely around the peripheral edge of the transparency to seal the edge of the glass plies to protect the coating against degradation caused by exposure to the environment, said sealant is non-reactive with the coating, the plies and materials between the plies and is selected from a group consisting of a polybutene copolymer based coating composition and a butyl based composition.

2. A laminated assembly comprising:
    first and second plies;
    a coating positioned between the plies with portions of the coating extending to a peripheral edge of the assembly; and
    a sealant on selected portions of the peripheral edge to isolate the coating at the edge from the environment, wherein the sealant is a weather resistant, non-reactive material selected from a group consisting of a polyvinylidene flouride based coating composition and a butane octane based coating composition to protect the coating against degradation caused by exposure to the environment.

3. The assembly as in claim 2 wherein said plies are glass plies with said coating positioned therebetween.

4. The assembly as in claim 2 wherein said coating is an electroconductive coating.

5. The assembly as in claim 3 wherein said coating is disposed between first and second interlayer plies positioned between said first and second glass plies.

6. The assembly as in claim 3 further including means to direct an electric current through said coating to heat said coating and said assembly.

7. The assembly as in claim 6 wherein said sealant is a non-electroconductive material.

8. The assembly as in claim 7 wherein said directing means includes first and second bus bars positioned along opposite sides of and interconnected by said coating.

9. The assembly as in claim 8 wherein said coating and said bus bars are on a major surface of said first glass ply.

10. The assembly as in claim 8 wherein said coating is disposed between first and second interlayer plies positioned between said first and second glass plies.

11. The assembly as in claim 2 wherein said sealant material is a polyvinylidene fluoride based coating composition.

12. The assembly as in claim 2 wherein the coating composition comprises a, a thermoplastic acrylic resin and an epoxy silane.

13. A laminated assembly comprising:
    first and second plies;
    a coating positioned between the plies with portions of the coating extending to a peripheral edge of the assembly; and
    a sealant on selected portions of the peripheral edge to isolate the coating at the edge from the environment, wherein the sealant comprises an isotatic thermoplastic polyolefin, a high molecular weight polyisobutylene resin, and a saturated hydrocarbon resin to protect the coating against degradation caused by exposure to the environment.

14. A laminated assembly comprising:
    first and second plies;
    a coating positioned between the plies with portions of the coating extending to a peripheral edge of the assembly; and
    a sealant on selected portions of the peripheral edge to isolate the coating at the edge from the environment, wherein the sealant comprises an isobutylene based elastomer, a high molecular weight polyisobutylene resin, and a saturated hydrocarbon resin to protect the coating against degradation caused by the environment.

15. In a method of fabricating a coated laminate including the steps of applying a coating between a pair of opposing plies and securing said plies to each other such that the coating is positioned therebetween, wherein portions of the coating extend to the peripheral edge of the laminate and are exposed to the environment, the improvement comprising:
    applying a weather resistant, non-reactive sealant selected from a group consisting of a polyvinylidene flouride based coating composition and a butane octane based coating composition to the exposed edge of the coating to prevent degradation of the coating caused by exposure to the environment.

16. The method as in claim 15 wherein said sealant applying step includes applying said sealant to said exposed coating edge and to a marginal edge portion of said coating adjacent said exposed coating edge, prior to said securing step.

17. The method as in claim 15 wherein said plies are glass plies and said sealant applying step includes applying said sealant to a marginal portion of one of said glass plies.

18. In a method of fabricating a coated laminate including the steps of applying a coating between a pair of opposing plies and securing said plies to each other such that the coating is positioned therebetween, wherein portions of the coating extend to the peripheral edge of the laminate and are exposed to the environment, the improvement comprising:
    applying a weather resistant, non-reactive, isotatic thermoplastic polyolefin, a high molecular weight polyisobutylene resin and a saturated hydrocarbon resin sealant to the exposed edge of the coating to prevent degradation of the coating caused by exposure to the environment.

19. The method as in claim 18 wherein said sealant applying step includes applying the sealant to the exposed coating edge and to a marginal edge portion of the coating adjacent the exposed coating edge, and said sealant applying step is practiced prior to said securing step.

20. The method as in claim 18 wherein the plies are glass plies and said sealant applying step includes applying the sealant to a marginal portion of one of the glass plies.

21. In a method of fabricating a coated laminate including the steps of applying a coating between a pair of opposing plies and securing the plies to each other such that the coating is positioned therebetween, wherein portions of the coating extend to the peripheral edge of the laminate and are exposed to the environment, the improvement comprising:

applying a weather resistant, non-reactive isobutylene based elastomer, a high molecular weight polyisobutylene resin, and a saturated hydrocarbon resin sealant to the exposed edge of said coating to prevent degradation of the coating caused by exposure to the environment.

22. The method as in claim 21 wherein said sealant applying step includes applying the sealant to the exposed coating edge and to a marginal edge portion of said coating adjacent said exposed coating edge, said sealant applying step is practiced prior to said securing step.

23. The method as in claim 21 wherein the plies are glass plies and said sealant applying step includes applying the sealant to a marginal portion of one of the glass plies.

* * * * *

UNITED STATES PATENT AND TRADEMARK OFFICE
CERTIFICATE OF CORRECTION

PATENT NO. : 5,122,403
DATED : June 16, 1992
INVENTOR(S) : Amy M. Roginski, Bruce A. Connelly and George H. Bowser It is certified that error appears in the above-identified patent and that said Letters Patent are hereby corrected as shown below:

Claim 12, column 8, line 8, delete "a," after the word "comprises".

Signed and Sealed this

Seventh Day of October, 1997

Attest:

BRUCE LEHMAN

*Attesting Officer*  *Commissioner of Patents and Trademarks*